United States Patent
Brown et al.

(10) Patent No.: US 9,546,742 B2
(45) Date of Patent: Jan. 17, 2017

(54) ILLUMINATED VALVE POSITION INDICATION

(71) Applicant: Bray International, Inc., Houston, TX (US)

(72) Inventors: Craig Brown, Houston, TX (US); Dan Walker, Houston, TX (US); James F. Schmidt, Jr., Houston, TX (US)

(73) Assignee: Bray International, Inc., Houston, TX (US)

( * ) Notice: Subject to any disclaimer, the term of this patent is extended or adjusted under 35 U.S.C. 154(b) by 172 days.

(21) Appl. No.: 14/070,100

(22) Filed: Nov. 1, 2013

(65) Prior Publication Data
US 2014/0116519 A1  May 1, 2014

Related U.S. Application Data

(63) Continuation-in-part of application No. 29/467,357, filed on Sep. 18, 2013, now Pat. No. Des. 716,416.

(60) Provisional application No. 61/721,123, filed on Nov. 1, 2012.

(51) Int. Cl.
*F16K 37/00* (2006.01)

(52) U.S. Cl.
CPC ...... *F16K 37/0041* (2013.01); *Y10T 137/0318* (2015.04); *Y10T 137/8242* (2015.04)

(58) Field of Classification Search
CPC .................................................. F16K 37/0058
USPC ......................................................... 116/233
See application file for complete search history.

(56) References Cited

U.S. PATENT DOCUMENTS

| | | | |
|---|---|---|---|
| 3,721,789 A | * | 3/1973 | Black ......................... 200/308 |
| 4,297,966 A | | 11/1981 | Liberman |
| 4,411,288 A | | 10/1983 | Gain, Jr. |
| 4,494,566 A | * | 1/1985 | Sinclair et al. ............. 137/556 |
| 4,545,406 A | | 10/1985 | King |
| 4,625,758 A | | 12/1986 | Murray |
| 4,635,901 A | | 1/1987 | Pond |
| 5,082,015 A | | 1/1992 | Baker |
| 5,137,052 A | | 8/1992 | Baumgart |
| 5,223,822 A | | 6/1993 | Stommes |
| 5,469,805 A | | 11/1995 | Gibbs |

(Continued)

OTHER PUBLICATIONS

Bray International, Inc., R4 Red Round Rotary Reliable Electric Actuator, Dec. 31, 1996, 12 pages, Bray International, Inc., Houston, Texas, United States.

(Continued)

*Primary Examiner* — Laura Martin
*Assistant Examiner* — Irving A Campbell
(74) *Attorney, Agent, or Firm* — Mark Oathout; Oathout Law Firm

(57) ABSTRACT

The disclosure relates to an embodiment of a valve position indicator having an indicator cover having at least one window and a rotor configured to be at least partially within the indicator cover. The rotor has an indicator surface with one or more position indicators wherein at least one of the position indicators is configured to align with the window on the indicator cover, thus indicating the position of a valve. A light may be positioned proximate the rotor and configured to illuminate the position indicator. The valve position indicator may also include an array of LED lights bordering the rim of the indicator cover. The valve position indicator may alternatively include the array of LED lights without the indicator cover.

20 Claims, 9 Drawing Sheets

(56) References Cited

U.S. PATENT DOCUMENTS

| | | | |
|---|---|---|---|
| 5,806,559 A * | 9/1998 | Takasaka | 137/556 |
| 5,957,158 A | 9/1999 | Volz | |
| 6,044,791 A | 4/2000 | LaMarca | |
| 6,079,441 A | 6/2000 | Miller | |
| 6,145,537 A | 11/2000 | McCutcheon | |
| 6,655,316 B2 | 12/2003 | Kerger | |
| 6,742,541 B2 | 6/2004 | Pimouguet | |
| 6,920,896 B2 | 7/2005 | Kerger | |
| 7,448,259 B2 | 11/2008 | Cole | |
| 7,549,440 B1 | 6/2009 | Campbell | |
| 7,819,133 B2 | 10/2010 | Minervini | |
| 8,272,281 B2 | 9/2012 | McCarty | |
| 8,424,563 B2 | 4/2013 | Haller | |
| 2007/0205232 A1 * | 9/2007 | Doyle et al. | 222/544 |

OTHER PUBLICATIONS

Bray International, Inc., Automator VRC Positioner Series, Dec. 31, 2001, 4 pages, Bray International, Inc., Houston, Texas, United States.

Bray International, Inc., Valve Position Monitors, NEMA 4, 4X, & NEMA 7, 9, Dec. 31, 2001, 2 pages, Bray International, Inc., Houston, Texas, United States.

Crane Chempharma Flow Solutions, SAUNDERS® I-VUE Intelligent Sensing Technology, Dec. 31, 2012, 8 pages, CRANE ChemPharma Flow Solutions®, Cincinnati, Ohio, United States.

* cited by examiner

ILLUMINATED VALVE POSITION INDICATION

STATEMENTS REGARDING FEDERALLY SPONSORED RESEARCH OR DEVELOPMENT

Not applicable.

NAMES OF THE PARTIES TO A JOINT RESEARCH AGREEMENT

Not applicable

BACKGROUND

Valves may be used in a number of applications to control the flow of fluids through piping systems. There are several different types of valves used for controlling flow such as ball valves, gate valves, butterfly valves, needle valves, check valves, and the like. Ball valves, butterfly valves, needle valves and gate valves may be actuated with an actuator, a manual hand wheel, or manual lever between the open and closed position. It may be difficult to know the position of the valve from the location of the actuator (for example, the hand wheel or power actuator). Therefore a need exists for an improved valve position indicator for use with valves. There is a further need for a valve indicator that better communicates the position of the valve through the display.

SUMMARY

A valve position indicator has an indicator cover with at least one window and a rotor configured to be located at least partially within the indicator cover. The rotor has an indicator surface with one or more position indicators wherein at least one of the position indicators is configured to align with at least one window to indicate the position of the valve. A light may be positioned proximate the rotor and configured to illuminate the position indicator. The valve position indicator may also include an array of LED lights bordering the rim of the indicator cover. The valve position indicator may alternatively include the array of LED lights without the indicator cover.

As used herein the term LED (or L.E.D.) shall mean light-emitting diode and/or any similar type light emitting device.

DETAILED DESCRIPTION OF EMBODIMENT(S)

The description that follows includes exemplary apparatus, methods, techniques, and instruction sequences that embody techniques of the inventive subject matter. However, it is understood that the described embodiments may be practiced without these specific details.

Figure 1:
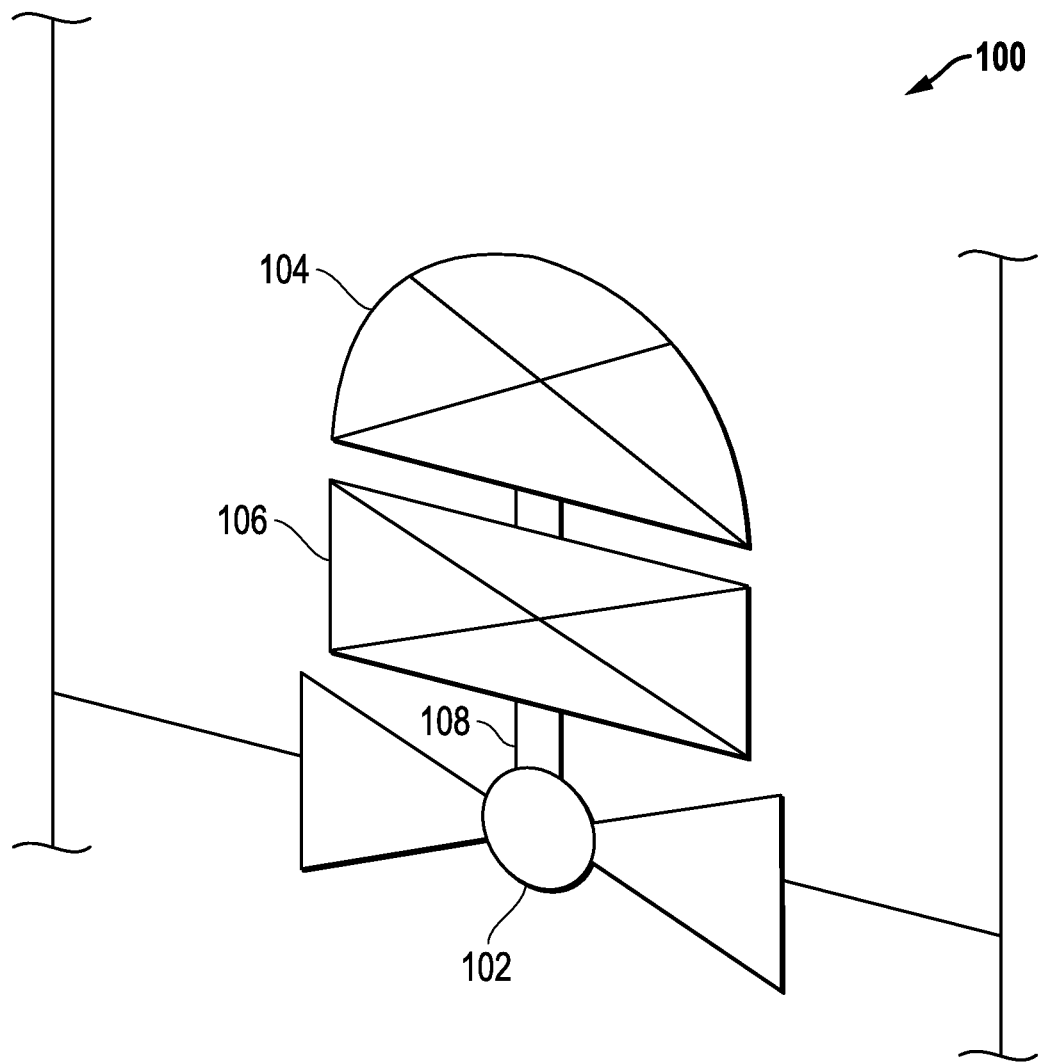
FIG. 1 depicts a schematic of a piping system having a valve with a valve position indicator.

FIG. 1 depicts a schematic view of a piping system 100 having a valve 102 with a valve position indicator 104 according to an embodiment. The piping system 100 may be any suitable piping system that requires the control of flow within the piping system 100. The valve 102 may have an actuator 106 configured to move the valve 102 between an open and a closed position. The actuator 106 may be any suitable actuator including, but not limited to, a pneumatic actuator, a hydraulic actuator, an electric actuator, a hand wheel, a lever, and the like. The actuator 106 may have an actuator shaft 108 configured to manipulate the valve position indicator 104 as the valve 102 moves between the open and closed position as will be discussed in more detail below. The actuator shaft 108 may be configured to move the valve 102 between the open and closed position, or be a separate shaft that moves as the valve 102 moves between the open and closed position.

Figure 2:
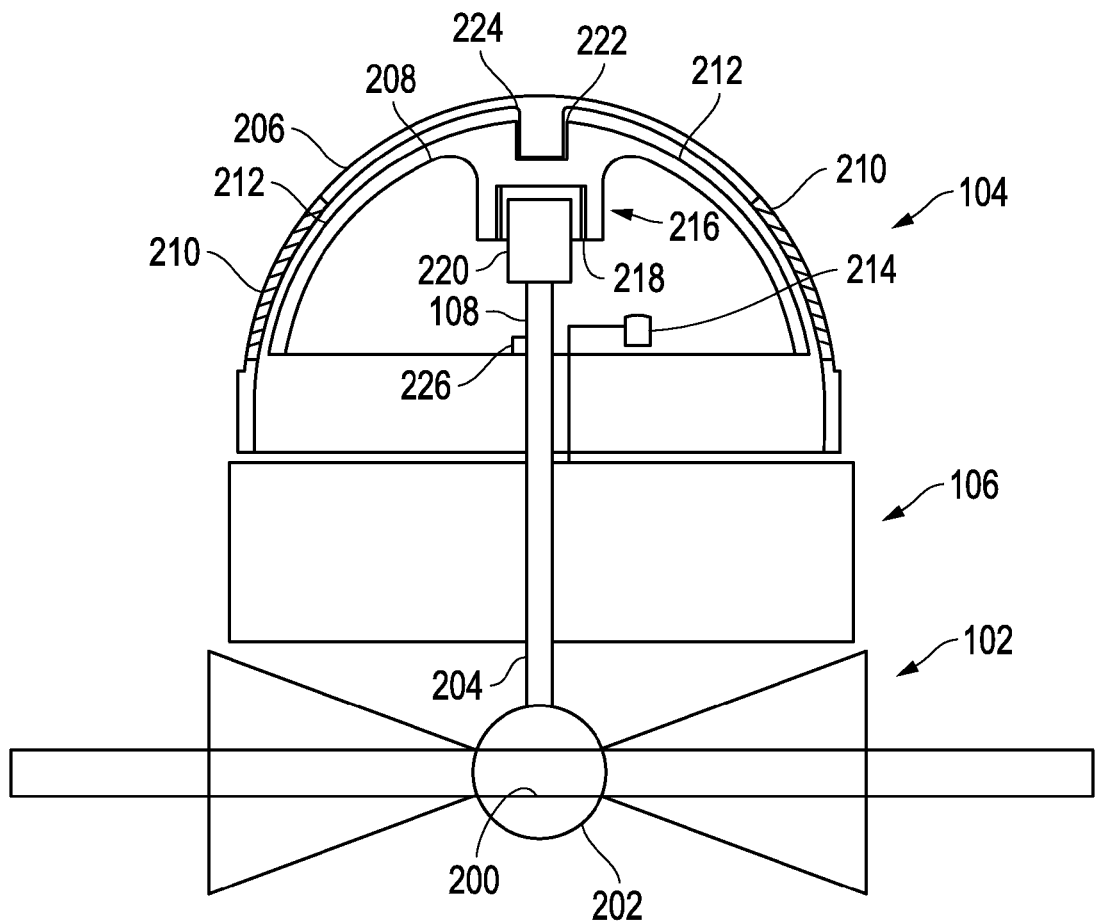
FIG. 2 depicts a cross-sectional view of the valve and the valve position indicator of FIG. 1 according to an embodiment.

FIG. 2 depicts a schematic view of the valve 102 and a cross sectional view of the valve position indicator 104. The valve 102 as shown is a ball valve having a bore 200 in an open position. In the open position, the bore 200 of the valve 102 may align with the bore of the piping system 100. The actuator 106 may be configured to move a ball 202 of the valve 102 between the open position and the closed position wherein the bore 200 is not aligned with the bore of the piping system 100. A valve stem 204 may be rotated by the actuator 106 in order to move the valve 102 between the open and closed position. The valve stem 204 may be integral with the actuator shaft 108 as shown, or a separate gear or mechanism may actuate the actuator shaft 108 with the valve stem 204. Although the valve 102 is described as a ball valve, the valve 102 may be any suitable valve including, but not limited to, a butterfly valve, a needle valve, a gate valve and the like.

The actuator 106 may be any suitable actuator for actuating the valve 102 including, but not limited to, a pneumatic actuator, a hydraulic actuator, an electric actuator, a hand wheel, a lever and the like.

The valve position indicator 104, as shown, rests above the actuator 106. Although the valve position indicator 104 is shown directly above the actuator 106, the valve position indicator 104 may be in any suitable location and/or side (such as, for example, mounted to the indicator mounting surface 107 of the actuator 106) so long as the actuator shaft 108 may actuate the valve position indicator 104 as will be discussed in more detail below. The valve position indicator 104 may include, but is not limited to, an indicator cover 206, a rotor 208, one or more windows 210 in the indicator cover 206, one or more indicator surfaces 212 on the rotor 208, a light source 214 (or lamp), and an actuator shaft connector 216. The actuator shaft 108 may rotate the rotor 208 as the valve 102 moves between the open and closed position. As the rotor 208 moves, the one or more indicator surfaces 212 may align with the one or more windows 210 thereby indicating the position of the valve 102.

The actuator shaft 108 may secure to the rotor 208 at the actuator shaft connector 216. As shown, the actuator shaft connector 216 has a female end 218 configured to receive a male end 220 of the actuator shaft 108. The female end 218 and/or male end 220 may be splined and/or shaped to allow the rotational transfer or torque between the actuator shaft 108 and the rotor 208 in an embodiment. In another embodiment, the actuator shaft 108 may be integral with or couple to the rotor 208 with a pin (not shown).

The indicator cover 206 and the rotor 208 are shown as being dome shaped. The dome of the rotor 208 may nest within the dome of the indicator cover 206. Although the indicator cover 206 and the rotor 208 are shown as arcuate domes it should be appreciated that they may have any suitable shape including cylindrical (inverted cup-shaped), conical, elliptical (any ellipse rotated about its central axis), geodesic domes and the like.

A rotor 208 may have an alignment hub 222 configured to receive a pin 224 on the indicator cover 206. With the pin 224 in the alignment hub 222, the indicator cover 206 may be positioned substantially symmetrical over the rotor 208. The alignment hub 222 may be free to rotate relative to the pin 224 as the actuator shaft 108 rotates the rotor 208. The indicator cover 206 may be coupled directly to the actuator 106, or another portion of the valve 102 in order to prevent the indicator cover 206 from rotating with the rotor 208.

Figure 3A:
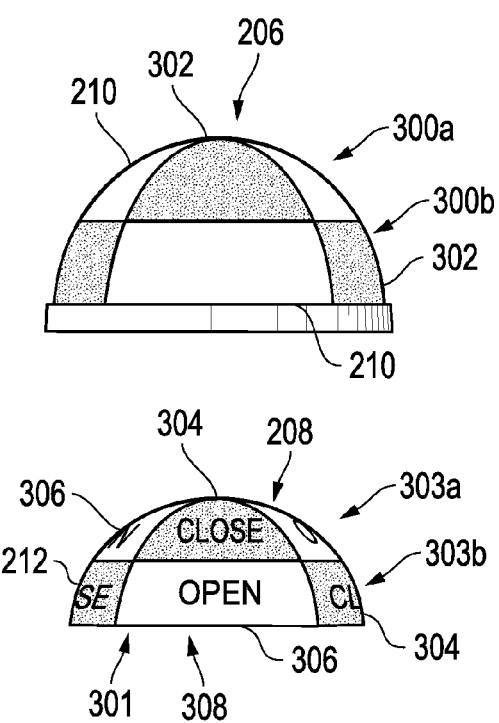
FIG. 3A depicts an exploded side view of the valve position indicator according to an embodiment.

FIG. 3A depicts an exploded side view of the indicator cover 206 and the rotor 208. The indicator cover 206 as shown has two rows 300 of windows 210 for viewing the indicator surfaces 212: a top row 300a having two windows 210 directly opposite one another and a bottom row 300b having two windows 210 directly opposite one another. Between the windows 210 is a panel 302. The panel 302 may be solid (not transparent). In one embodiment, the panel 302 may have a black color, or shade. Although the panel 302 is described as being a black color, it should be appreciated that the panel 302 may be any color so long as it is not transparent.

The rotor 208 may have two indicator rows 303 that align with the row 300 of the indicator cover 206 when the rotor 208 is nested in the indicator cover 206. The indicator surfaces 212 may have one or more position indicators 301 which may be further designated as one or more closed indicators 304, and/or one or more open indicators 306. As shown, the rotor 208 has two closed indicators 304 on the top indicator row 303a (appearing with a dome shape overlaid on a spherical surface as viewed in FIG. 3A) and two closed indicators 304 on the bottom indicator row 303b (appearing with a trapezoid-like shape overlaid on a spherical surface as viewed in FIG. 3A). The rotor 208 may have two open indicators 306 on the top indicator row 303a (appearing with a dome shape overlaid on a spherical surface as viewed in FIG. 3B) and two open indicators 306 on the bottom indicator row 303b (appearing with a trapezoid-like shape overlaid on a spherical surface as viewed in FIG. 3B). The open indicators 306 and the closed indicators 304 may have the same pattern as the windows 210 and panels 302 of the indicator cover 206. Although there are four panels 302 and four windows 210 on the indicator cover 206 that align with four open indicators 306 and four closed indicators 304 on the rotor 208, it should be appreciated that any number of panels 302, windows 210, open indicators 306 and closed indicators 304 can be used so long as the indicator surfaces 212 align with the windows 210 and panels 302 to clearly display the open position or the closed position.

When the valve 102 is in the closed position, the closed indicator 304 is aligned with the window 210 thereby displaying the closed indicator 304 through the window 210. The closed indicators 304 may have a word indicating the closed position. As shown, the closed indicator 304 has the word "CLOSE" on the surface of the closed indicator 304. Although the word is shown as "CLOSE", it should be appreciated that any suitable word and/or symbol may be used to indicate the closed position (by way of example, the position indicator term 308 for the closed indicator 304 may be "CLOSED" or "NOT FLOWING"). In addition to or as an alternative to the word indicator, the closed indicators 304 may have a color coating. In one embodiment, the closed indicator 304 may be a red color. Although the closed indicator 304 is described as red in one embodiment, it may be any suitable color (by way of example, the closed indicator 304 could be blue or green).

When the valve 102 is in the open position, the open indicator 306 is aligned with the window 210 thereby displaying the open indicator 306 through the window 210. The open indicators 306 may have a word indicating the open position. As shown, the open indicator 306 has the word "OPEN" on the surface of the open indicator 306. Although the word is shown as "OPEN", it should be appreciated that any suitable word and/or symbol may be used to indicate the open position (by way of example, the position indicator term 308 for the open indicator 306 may be "OPENED" or "FLOWING"). In addition to or as an alternative to the word indicator, the open indicators 306 may have a color coating. In one embodiment, the open indicator 306 may be a yellow color. Although the open indicator 306 is described as yellow in one embodiment, it may be any suitable color (by way of example, the open indicator 306 could be blue or green so long as its color is distinguishable from the color of the closed indicator 304).

FIG. 3A shows the rotor 208 positioned in the open position if it were nested in the indicator cover 206. In the open position the four open indicators 306 align with the windows 210 of the open indicator 306. The rotor 208 will stay in the open position displaying the open indicators 306 through the window 210. In this position, the closed indicators 304 are located under the panels 302, thereby blocking the view of the closed indicators 304. The rotor 208 will stay in the open position until the valve 102 is moved to the closed position. The valve 102 will remain in the open position until the valve is closed.

Figure 3B:
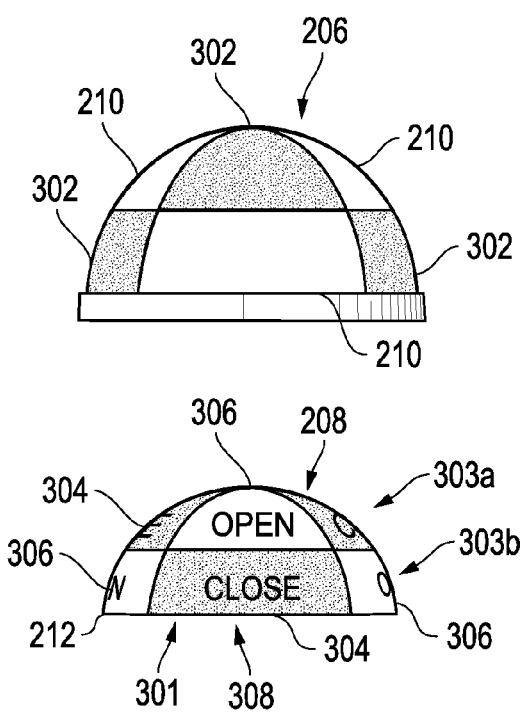
FIG. 3B depicts an exploded side view of the valve position indicator according to an embodiment.

FIG. 3B shows the rotor 208 positioned in the closed position if it were nested in the indicator cover 206. In the closed position the four closed indicators 304 align with the windows 210 of the closed indicator 304. In this position, the open indicators 306 are located under the panels 302, thereby blocking the view of the open indicators 306.

The valve position indicator 104 may have the light source 214 as shown in FIG. 2 that illuminates the interior of the rotor 208. The rotor 208 may be made of a semi translucent material that allows the light to pass through the rotor 208. The light may illuminate the open indicators 306 and the closed indicators 304. The illumination may allow the open indicator 306 or the closed indicator 304 to be illuminated when they are aligned with the windows 210. The illumination may allow the open indicator 306 and the closed indicator 304 to be seen easily by an operator and/or worker on the valve 102. The light source 214 may be any suitable light source including, but not limited to, a light emitting diode (LED), a florescent light, an incandescent light bulb, and the like. The light source 214 may be a white light or a colored one. By way of example, one such embodiment of a light source 214 may be a three-wire LED where powering first and second wires emits one color (e.g. a yellow light), and powering first and third wires emits a second color (e.g. a red light). Various different colored light(s) and options for different colors may be implemented.

The wording "OPEN" and/or "CLOSE" may be omitted in the entirety from the valve position indicator 104 such that color (and optionally sound) may be used exclusively to indicate positioning of the valve through the closed and open indicators 304 & 306. Or, The wording "OPEN" and/or "CLOSE" plus the closed and open indicators 304 & 306 may be omitted in the entirety from the valve position indicator 104 such that the entire valve position indicator 104 (dome as the case may be) illuminates only one given color at any moment in time to indicate valve position (by way of example only, the color red illuminating the entire dome indicating "close", the color "green" indicating "open", and the color "yellow" indicating transitioning with the option to include flashing colors for communication as well). In the later example, it is possible to eliminate the rotor 208, and use a light source(s) 214 only in combination with the indicator cover 206.

Figure 4:
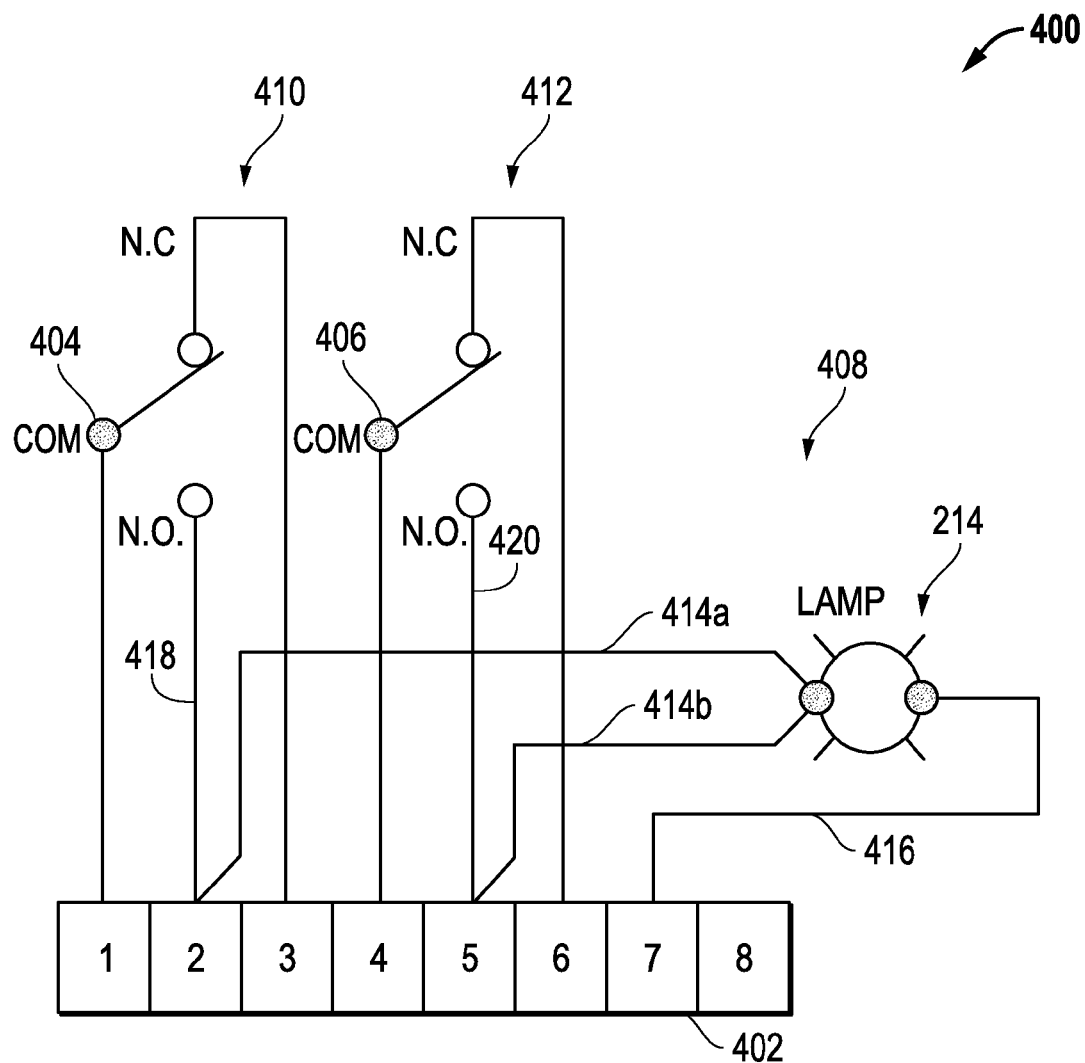
FIG. 4 depicts a wiring diagram for operating an indication lamp of the valve position indicator according to an embodiment.

FIG. 4 depicts a wiring diagram 400 for the light source 214 of the valve actuator according to an embodiment. The wiring diagram 400 depicts a terminal block 402, an open switch 404, a close switch 406, a lamp circuit 408, an open circuit 410, and a close circuit 412. The lamp circuit 408 is connected to the terminal block 402 at position (2), position (5) and position (7). The lamp circuit 408 has two supply legs 414a and 414b from position (2) and position (5) respectively to the light source 214. The lamp circuit 408 has a return leg 416 returning to position (7) of the terminal block 402. As shown, the open circuit 410 is connected to the terminal block 402 at position (1), position (2), and position (3). When the open switch 404 is in the off position, as shown, the open circuit 410 may be supplied from position (1) and returned to position (3). When the open switch 404 is in the on position, the open switch 404 is connected to an open switch return leg 418 that is connected to position (2) of the terminal block 402 that in turn supplies the supply leg 414a thereby lighting the light source 214. As shown, the close circuit 412 is connected to the terminal block 402 at position (4), position (5), and position (6). When the close switch 406 is in the off position, as shown, the close circuit 412 may be supplied from position (4) and returned to position (6). When the close switch 406 is in the on position, the close switch 406 is connected to a close switch return leg 420 that is connected to position (5) of the terminal block 402 that in turn supplies the supply leg 414b thereby lighting the light source 214. It should be appreciated that any suitable circuit to operate the light source 214 may be used.

Figure 5:
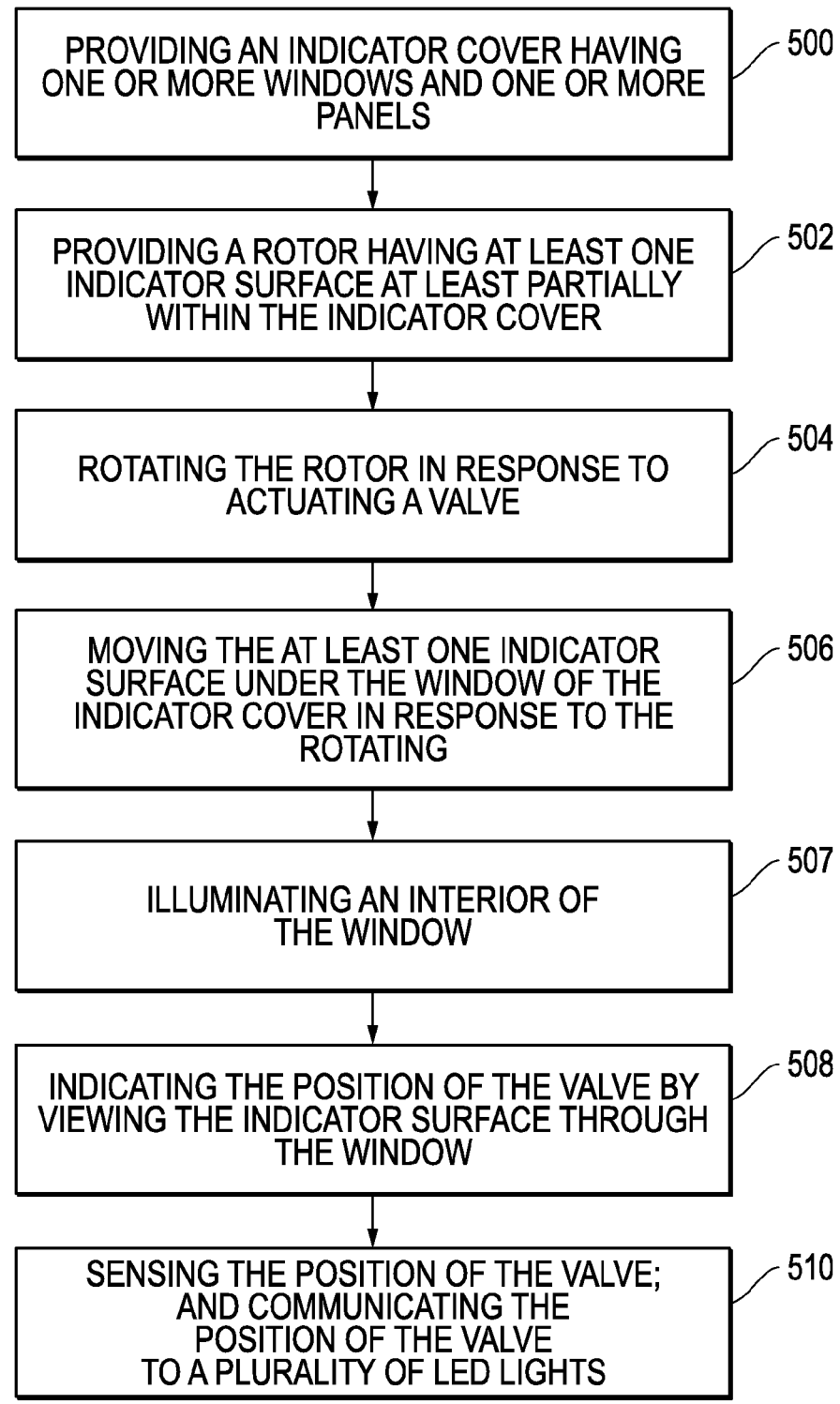
FIG. 5 is a flowchart depicting a method for operating the valve position indicator in an embodiment.

FIG. 5 depicts a flowchart depicting a method for operating the valve position indicator 104 in an embodiment. The flowchart begins at block 500 wherein an indicator cover is provided having one or more windows and one or more panels. The flowchart continues at block 502 wherein a rotor is provided having at least one indicator surface at least partially within the indicator cover. The flowchart continues at block 504 wherein the rotor is rotated in response to actuating a valve. The flowchart continues at block 506 wherein the at least one indicator surface moves under the window of the indicator cover in response to the rotating. The flowchart continues at block 507 wherein the interior of the window is illuminated. The flowchart continues at block 508 wherein the position of the valve is indicated by viewing the indicator surface 212 through the window. The flowchart may continue at block 510 wherein the position of the valve can be sensed and communicated to a plurality of LED lights.

Figure 6:
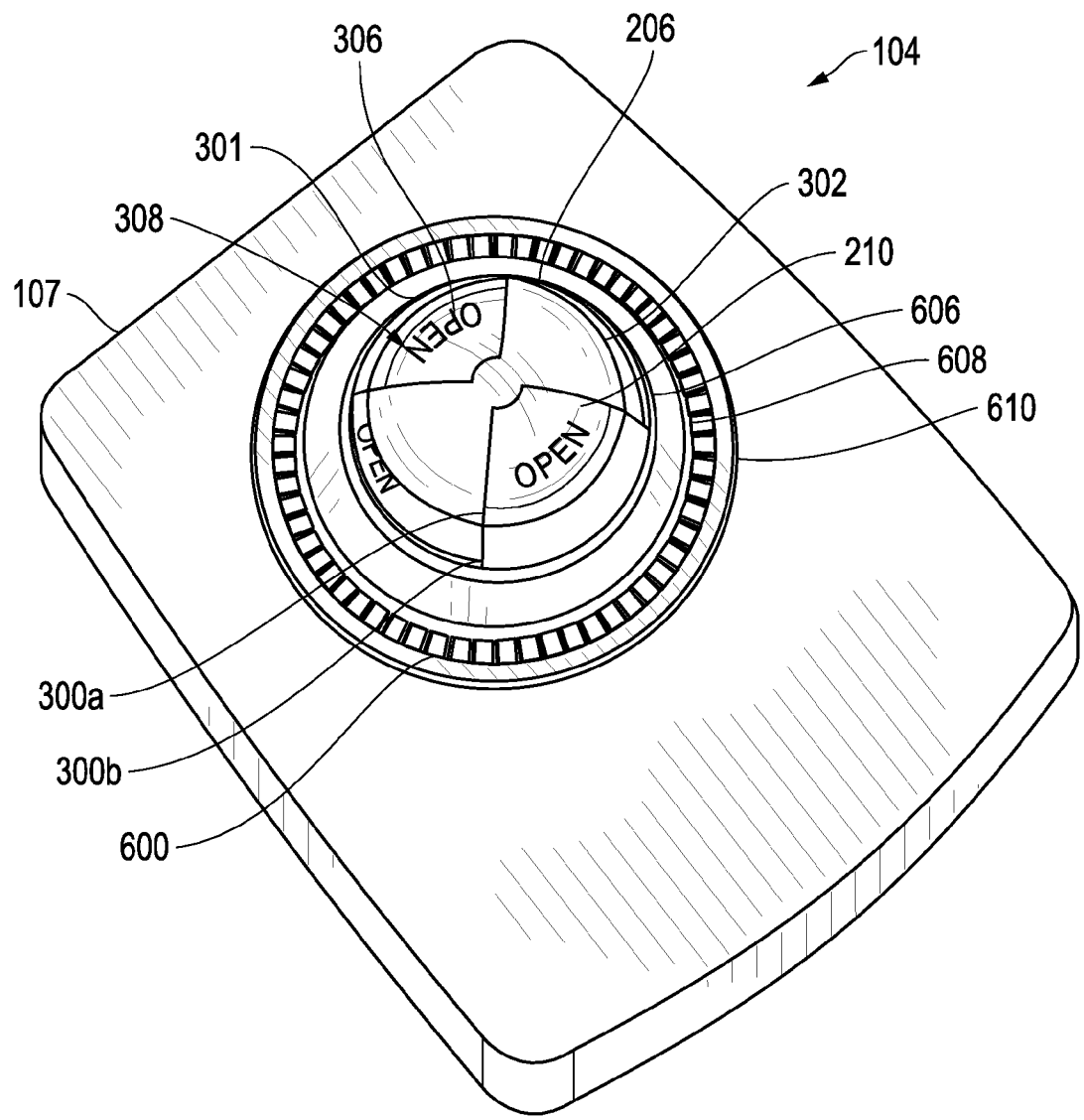
FIG. 6 depicts a perspective view of a valve position indicator according to an alternative embodiment.
Figure 7B:
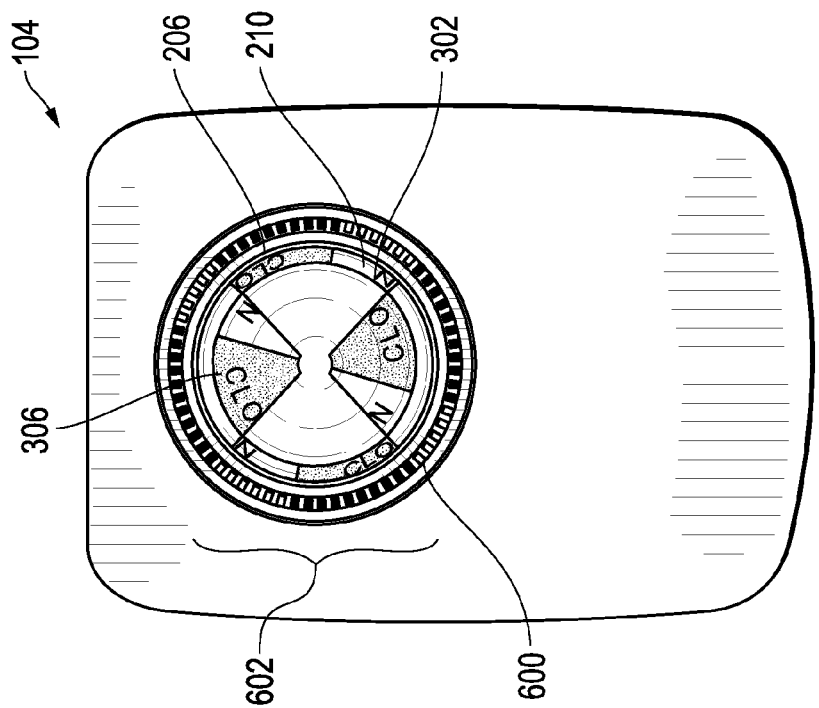
FIG. 7B depicts a view similar to FIG. 7A except showing the valve in a different position.
Figure 7A:
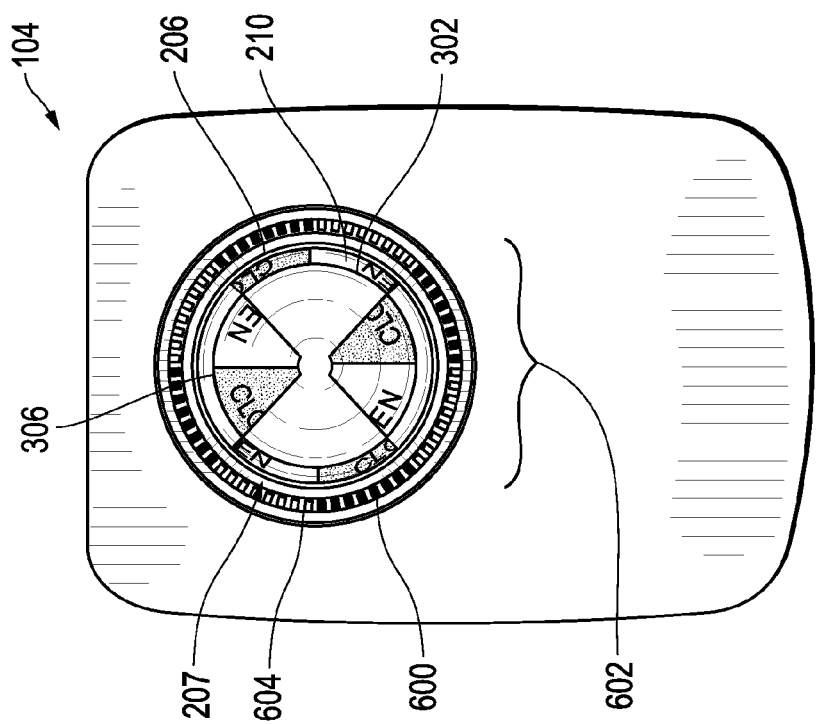
FIG. 7A depicts a top view of a valve position indicator according to an alternative embodiment.

FIG. 6 depicts a perspective view of a valve position indicator according to an alternative embodiment in an open position. The embodiment depicted in FIG. 6 includes a row or array of LED lights 600 arranged in a concentric circle or ring on the indicator mounting surface 107 around and bordering the rim or perimeter 207 of the indicator cover 206. As seen in FIGS. 7A and 7B, the circle of LED lights 600 may be further subdivided into any number of sections 602 to demonstrate the valve position. The sections 602 may align with the panels 302 and windows 210 of the indicator cover 206. As seen in FIGS. 7A and 7B, the LED lights 600 comprise four sections 602 of 90°, to align with the two panels 302 and two windows 210 on the bottom indicator row 300b of the indicator cover 206. It is to be appreciated that the disclosure encompasses embodiments comprising different combinations of numbers of panels 302, windows 210, and sections 602.

The LED lights 600 also participate in visually indicating the valve position through illumination in combination with or complementary to the embodiment depicted in FIG. 2 (although such features may also be implemented independent of or without the indicator cover 206 and rotor 208). Specifically, the LED lights 600 can easily indicate the gradual increment, percentage, amount, or degree by which valve 102 is open through a combination of illuminated LEDs, un-illuminated LEDs, and/or different color LEDs. The gradual increment, percentage, amount, or degree that valve 102 is open may be communicated by a sensor 226 (see FIG. 2 for example) located on, proximate or near the actuator shaft 108. By way of example only, and as depicted in FIG. 7A, if the valve 102 (i.e. and actuator shaft 108) is halfway or fifty percent open, then fifty percent, or 45° of the contiguous lights of the 90° in section 602 of LED lights 600 may be illuminated (via sensor 226 providing a signal to the array of LED lights 600), and 45° of the remainder of each section 602 would not be illuminated. If the valve 102 is fully open, as is depicted in FIG. 6, the entire circle of LED lights 600 would be illuminated; if the valve 102 is fully closed, the entire circle of LED lights 600 would not be illuminated (or may be illuminated in as alternative color, such as, for example, red).

In addition, and as another example depicted in FIG. 7B, if the circle of LED lights 600 were to be divided into four sections 602 of 90° and the valve 102 were one-third open, then one-third, or 30° of each subsection of the LED lights 600 would be illuminated, and 60° of each subsection of the LED lights 600 would not be illuminated. Alternatively, illumination of the LED lights 600 may be used to indicate the increment, percentage, amount, or degree by which the valve 102 is closed, and the number of un-illuminated LED lights 600 may be used to indicate the degree by which the valve 102 is open.

Further, circle of LED lights 600 may consist of two indicator colors, where a first color may indicate the amount that the valve 102 is open, and the second color may indicate the amount that the valve 102 is closed. By way of example only, a green illuminated color may indicate an incremental open position, and a red illuminated color may indicate an incremental closed position. The LED lights 600 may be white or of any illuminated color. In addition, the LED lights 600 function in conjunction with the position indicators 301, position indicator terms 308 and/or light source 214 to show the valve position.

The row or array of LED lights 600 as shown are a plurality of equidistantly spaced panes 604 arranged in a continuous concentric circle or ring around and bordering the rim or perimeter 207 of the indicator cover 206. However, the row or array could be less than completing an entire circle or ring, for example, running only in arcs of ninety degrees in two sets. The panes 604 as shown are rectangular although they could be another shape (e.g., square, round, etc.). The panes 604 could be flush, raised, crowned, or bulbous relative to the indicator mounting surface 107. The pane(s) 604 could be a single unitary strip pane of annular, "C"-shape, tapered spiral, linear (all not shown) or other shape mounted on the indicator mounting surface 107 bordering the rim or perimeter 207 of the indicator cover 206.

The indicator mounting surface 107 may include ridge(s) 606, 608 and plateau(s)/furrow(s) 610 as part of a clamping/clasping mechanism for retention of the indicator cover 206, to raise or enhance the visibility panes 604, and/or simply to enhance the appearance of the valve position indicator 106. First ridge 606 may be taller than second ridge 608.

Figure 8:
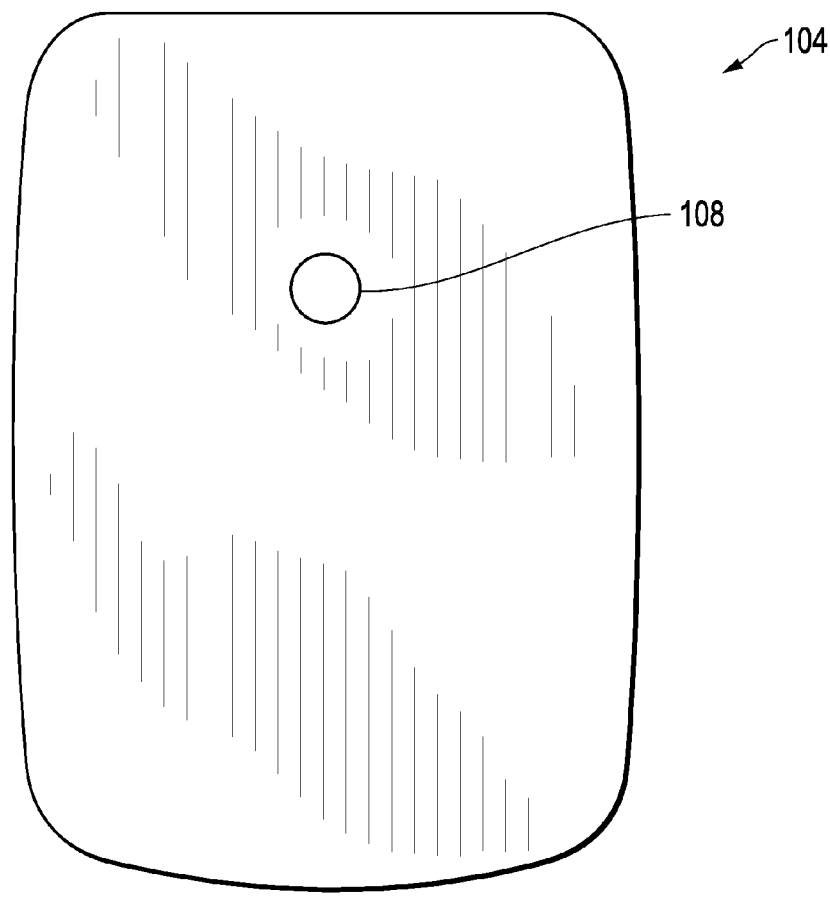
FIG. 8 depicts an underside view of the valve position indicator according to an embodiment.
Figure 9:
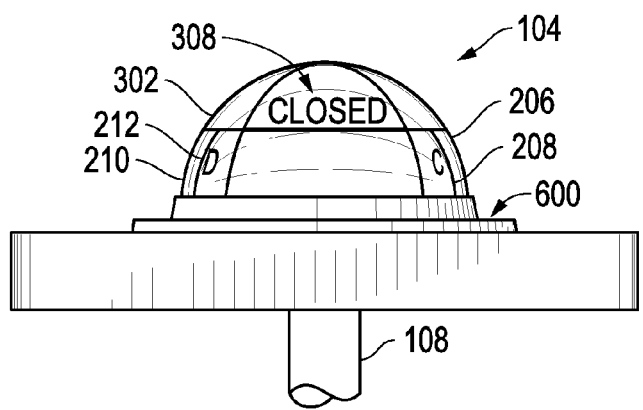
FIG. 9 depicts a front view of the valve position indicator in the "CLOSED" position according to an embodiment.

FIG. 8 depicts an underside view of the valve position indicator 104 and FIG. 9 depicts a front view of the valve position indicator 104 in the "CLOSED" position according to an embodiment. FIGS. 8 and 9 together illustrate the actuator shaft 108 in relation to the other features of valve position indicator 104. Note that the actuator shaft 108 preferably rests directly beneath the indicator cover 206 and rotor 208. The actuator shaft 108 is connected to the valve position indicator 104 at one end through an actuator shaft connector 216 (see FIG. 2) and actuates the rotor 208 to display one or more indicator surfaces 212. At the other end, the actuator shaft 108 is connected to the valve 102 (see FIG. 1). When valve 102 changes position between an open and closed position, the actuator shaft 108 relays or communicates the change to the valve position indicator 104, and the position is displayed by the indicator surfaces 212 and/or LED lights 600.

Figure 10:
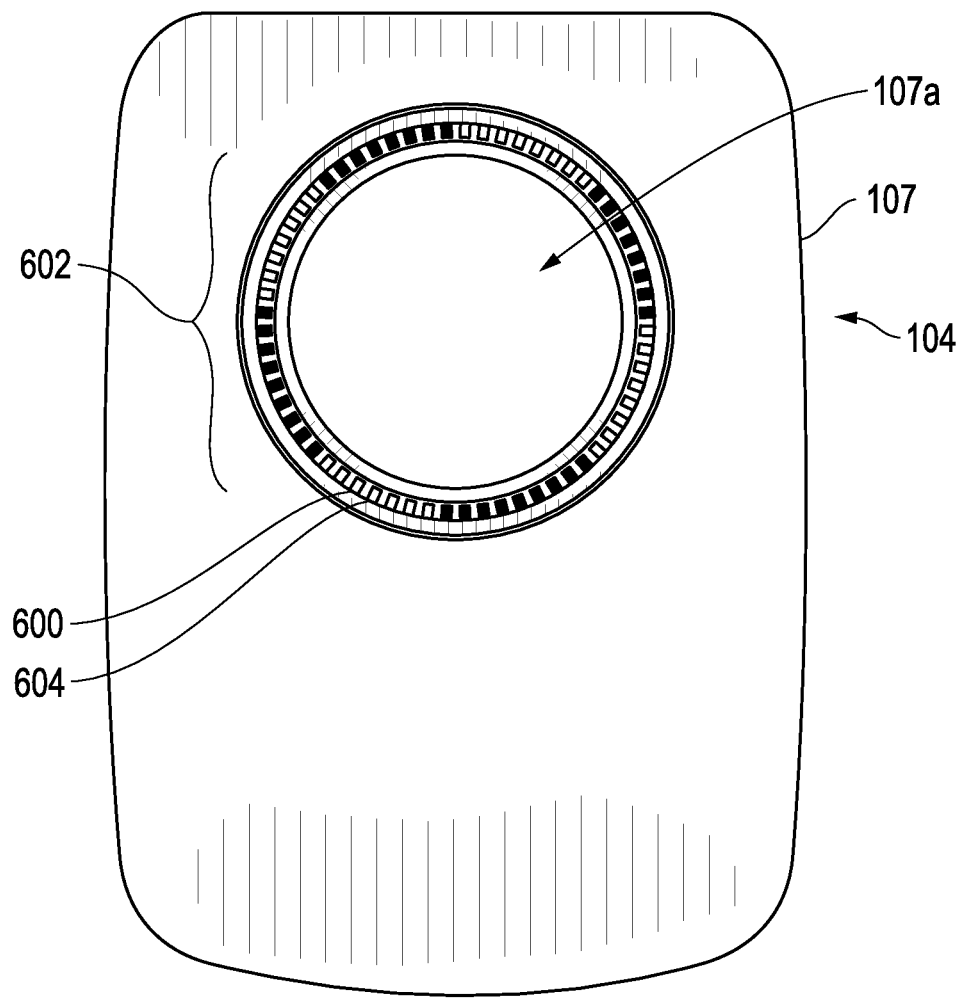
FIG. 10 depicts a top view of another embodiment of the valve position indicator.

FIG. 10 depicts a top view of another embodiment of the valve position indicator 104. The valve position indicator 104 in FIG. 10 has a circle of LED lights 600 divided into four sections 602 which are set on top of indicator mounting surface 107. However, in the embodiment envisioned in FIG. 10, the embodiment does not have an indicator cover 206 or rotor 208 on the center of indicator mounting surface 107a (i.e. the center of the indicator mounting surface 107a is simply a continuation of the indicator mounting surface 107 as bounded or divided by the array of LED lights 600 arranged in a circle or annular ring). Rather, the indication of the valve 102 position is communicated to the viewer by the illumination of the circle of LED lights 600 without the aid of the dome-shaped indicator cover 206, rotor 208, and/or indicator terms 308. The valve 102 depicted in FIG. 10 is at half-open and half-close position, which is illustrated in the illumination of each section 602. Within each section 602, 50% of the panes 604 of the LED lights 600 are illuminated a first color to communicate an open position, and 50% of the panes 604 of LED lights 600 are un-illuminated (or alternatively, illuminated a second color) to communicate a closed position. Although four sections 602 are illustrated in the embodiment, it is to be appreciated that any number of sections 602 may be utilized to communicate the position of the valve 102 to the observer of the valve position indicator 104.

While the embodiments are described with reference to various implementations and exploitations, it will be understood that these embodiments are illustrative and that the scope of the inventive subject matter is not limited to them. Many variations, modifications, additions and improvements are possible. For example, the implementations and techniques used herein may be applied to any one way valve in multiple types of piping systems, for example pump systems.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter. Applicant hereby incorporates by reference the related U.S. Provisional Application No. 61/721,123 filed Nov. 1, 2012.

What is claimed is:

1. A valve comprising:
   an actuator;
   a valve position indicator coupled to the actuator, wherein the valve position indicator comprises:
   an indicator cover clasped over an indicator mounting surface, wherein the indicator cover has a rim;
   a plurality of LED lights arranged in a circle on the indicator mounting surface around and bordering the rim of the indicator cover, wherein the plurality of LED lights are configured to illuminate no greater than one given color at any moment in time in response to a position of the valve; and
   a sensor in communicative connection with the actuator and the plurality of LED lights, wherein the sensor is configured to communicate the position of the valve to the plurality of LED lights.

2. The valve of claim 1, wherein the plurality of LED lights are configured to illuminate corresponding to an incremental position of the valve.

3. The valve of claim 1, wherein the valve position indicator further comprises:
   a plurality of windows separated by non-transparent panels on the indicative cover; and
   a rotor configured to be located at least partially within the indicator cover, the rotor having an indicator surface having a position indicator wherein the position indicator is configured to align with the windows of the indicator cover thereby indicating a position of the valve, and wherein the rotor is configured to rotatably nest within the indicator cover.

4. The valve of claim 3, wherein the actuator is configured to rotate the rotor relative to the indicator cover as the actuator actuates the valve between an open and a closed position and wherein the position indicator further comprises an open position indicator comprising the word "OPEN" on the indicator surface and a close position indicator comprising the word "CLOSE" on the indicator surface.

5. The valve of claim 3, wherein the position indicator includes two position indicator terms.

6. The valve of claim 3, wherein the position indicator further comprises a first position indicator and a second position indicator, and wherein the first position indicator is a first color and the second position indicator is a second color.

7. The valve of claim 6, wherein the first color is yellow on the indicator surface, and the second color is red on the indicator surface.

8. The valve of claim 1, wherein the indicator mounting surface has a ridge.

9. The valve of claim 1, wherein the plurality of LED lights each emit greater than one color.

10. The valve of claim 1, wherein the given color is white.

11. The valve of claim 1, wherein the plurality of LED lights are configured to consecutively indicate the gradual incremental degree by which the valve is opened.

12. The valve of claim 1, wherein the plurality of LED lights are configured to consecutively indicate the gradual incremental degree by which the valve is closed.

13. The valve of claim 1, wherein the plurality of LED lights are all configured to illuminate a first color when the valve is closed, a second color when the valve is open, and a third color when the valve is transitioning between open and closed.

14. A valve position indicator coupled to an actuator, comprising:
   an indicator cover mounted over an indicator mounting surface, wherein the indicator cover has a rim;
   a plurality of LED lights arranged in a circle on the indicator mounting surface around and bordering the rim of the indicator cover, wherein the plurality of LED lights are configured to illuminate no greater than one given color at any moment in time in response to a position of a given value; and
   a sensor in communicative connection with the actuator and the plurality of LED lights, wherein the sensor is configured to communicate the position of the valve to the plurality of LED lights.

15. The valve of claim 14, wherein the valve position indicator further comprises:
   a plurality of windows separated by non-transparent panels on the indicative cover; and
   a rotor configured to be located at least partially within the indicator cover, the rotor having an indicator surface having a position indicator wherein the position indicator is configured to align with the windows of the indicator cover thereby indicating a position of the valve, and wherein the rotor is configured to rotatably nest within the indicator cover.

16. The valve of claim 14, wherein the indicator mounting surface has a ridge.

17. The valve of claim 14, wherein the plurality of LED lights each emit greater than one color.

18. The valve of claim 14, wherein the plurality of LED lights are configured to consecutively indicate the gradual incremental degree by which the valve is opened.

19. The valve of claim 14, wherein the plurality of LED lights are configured to consecutively indicate the gradual incremental degree by which the valve is closed.

20. The valve of claim 14, wherein the plurality of LED lights are all configured to illuminate a first color when the valve is closed, a second color when the valve is open, and a third color when the valve is transitioning between open and closed.

* * * * *